US009231799B2

(12) United States Patent
Roper et al.

(10) Patent No.: US 9,231,799 B2
(45) Date of Patent: Jan. 5, 2016

(54) VLF TRANSMIT ANTENNA SYSTEM, METHOD AND APPARATUS

(71) Applicant: VITAL ALERT COMMUNICATION INC., Thornhill (CA)

(72) Inventors: Michael James Roper, Ottawa (CA); Vladimir Puzakov, Kanata (CA)

(73) Assignee: VITAL ALERT COMMUNICATION INC., Thornhill, Ontario (CA)

( * ) Notice: Subject to any disclaimer, the term of this patent is extended or adjusted under 35 U.S.C. 154(b) by 0 days.

(21) Appl. No.: 14/358,747

(22) PCT Filed: Nov. 19, 2012

(86) PCT No.: PCT/CA2012/001091
§ 371 (c)(1),
(2) Date: May 16, 2014

(87) PCT Pub. No.: WO2013/071426
PCT Pub. Date: May 23, 2013

(65) Prior Publication Data
US 2014/0314129 A1  Oct. 23, 2014

Related U.S. Application Data

(60) Provisional application No. 61/561,134, filed on Nov. 17, 2011.

(51) Int. Cl.
*H04B 13/02* (2006.01)
*H04L 25/49* (2006.01)
(Continued)

(52) U.S. Cl.
CPC ............. *H04L 25/4902* (2013.01); *H01Q 1/04* (2013.01); *H01Q 7/00* (2013.01); *H04B 5/0075* (2013.01); *H04B 13/02* (2013.01)

(58) Field of Classification Search
CPC .............................. H04B 13/02; H04B 5/0081
USPC .......................................... 375/218–221, 358
See application file for complete search history.

(56) References Cited

U.S. PATENT DOCUMENTS 3,939,422 A * 2/1976 Deise ............................ 375/304
5,093,929 A * 3/1992 Stolarczyk et al. ............. 455/40
(Continued)

FOREIGN PATENT DOCUMENTS

| GB | 2455845 A | 6/2009 |
|----|-----------|--------|
| WO | 9727645 A1 | 7/1997 |
| WO | 2012006711 A1 | 1/2012 |

OTHER PUBLICATIONS

Lagace et al., "Transmit Antennas for Portable VLF to MF wireless Mine Communications", US Bureau of Mines, May 1977.*
(Continued)

*Primary Examiner* — Qutbuddin Ghulamali
(74) *Attorney, Agent, or Firm* — Norton Rose Fulbright Canada LLP; Maya Medeiros

(57) ABSTRACT

There is provided a Very Low Frequency (VLF) transmit antenna system, method, and apparatus for creating a magnetic field at low frequencies suitable for communications through the earth or other thick, solid barriers. At least two loop antennas are arranged such that a magnetic field of each one of the at least two loop antennas passes through each remaining one of the at least two loop antennas, thereby closely coupling the at least two loop antennas. A full bridge Pulse Width Modulated transmitter is directly connected to each loop antenna for driving the latter. When a loop of a given loop antenna is broken and its magnetic field collapses, the transmitters connected to the remaining loop antennas increase the current in the remaining loops to maintain a constant magnetic field.

16 Claims, 8 Drawing Sheets

(51) Int. Cl.
  *H01Q 7/00* (2006.01)
  *H04B 5/00* (2006.01)
  *H01Q 1/04* (2006.01)

(56) References Cited

U.S. PATENT DOCUMENTS

| | | | |
|---|---|---|---|
| 5,633,649 A * | 5/1997 | Grossi et al. | 343/895 |
| 6,813,324 B1 * | 11/2004 | Yewen | 375/354 |
| 6,993,302 B2 * | 1/2006 | Bausov et al. | 455/127.1 |
| 7,522,740 B2 * | 4/2009 | Julstrom et al. | 381/331 |
| 2008/0171512 A1 | 7/2008 | Jack et al. | |
| 2014/0113828 A1 * | 4/2014 | Gilbert et al. | 505/100 |

OTHER PUBLICATIONS

Fraser-Smith, et al., "Air/Undersea Communication at Ultra-Low-Frequencies Using Airborne Loop Antennas", Technical report No. 4207-6, Stanford University, CA, Jun. 1977.*

Patent Cooperation Treaty, Written Opinion and International Search Report dated Feb. 19, 2013, issued on PCT Application No. PCT/CA2012/001091.

Markham et al., "Revealing the hidden lives of underground animals using magneto-inductive tracking", SenSys '10 Proceedings of the 8th ACM Conference on Embedded Networked Sensor Systems, Jan. 1, 2010, p. 281-294, New York, New York, USA.

European Patent Office, Supplementary European Search Report dated Jun. 30, 2015, issued on European Application No. 12850296.0.

* cited by examiner

VLF TRANSMIT ANTENNA SYSTEM, METHOD AND APPARATUS

CROSS-REFERENCE TO RELATED APPLICATIONS

This application claims priority under 35 USC §119(e) of U.S. Provisional Patent Application No. 61/561,134 filed on Nov. 17, 2011, the contents of which are hereby incorporated by reference.

TECHNICAL FIELD

This invention relates to Very Low Frequency (VLF) transmit antennas suitable for communications through the earth or other thick, solid barriers.

BACKGROUND OF THE INVENTION

It is known that most current wireless communication technologies are unable to traverse a thick solid barrier made from materials such as rock, concrete or soil. At frequencies greater than a few kHz, the skin depth of these weakly conductive materials is quite small and electromagnetic waves are attenuated to the point where communication is not possible over even short distances (less than one meter) through solid materials. In work environments such as tunnels and mines, workers are therefore not able to readily communicate, for example, with supervisors or other workers located at a different part of the tunnel or located above the surface of the earth.

Such communication systems are not only useful for regular day-to-day work; they are indispensable in times of emergency. For example, if a tunnel collapses with a worker inside, providing such communications could significantly reduce the time to find and rescue the trapped worker. This would provide a significant improvement in the chances of saving the life of the worker.

Therefore, some wireless solutions have also been proposed for through-the-earth communication based on magneto-inductive communications. These systems use a conductive wire loop to generate the transmitted magnetic field at a very low carrier frequency, typically below 10 kHz. The strength of the magnetic field created by a loop antenna is given by the antenna Dipole Moment, D, where $$D = A * I * N, \qquad [1]$$

A=the antenna area, in m$^2$
I=the antenna current, in Amps
N=the number of turns in the loop In coal mining applications, safety limits are imposed on the current flowing through a wire of given inductance in order to prevent an open circuit from creating a spark capable of igniting an air-methane mixture. This directly affects the current, size and number of turns used in a loop antenna, and hence the dipole moment. This in turn limits the range available from a magneto-inductive communications system that is safe to use in a coal mine.

It is known to use a loop antenna for both transmit and receive functions of a through-the-earth radio. Such an antenna may comprise a number of bundles of conductors, which may be connected in parallel to form a low resistance transmit antenna, or in series to increase the number of turns in the loop for receive purposes. The antenna may have a single feed point for transmission. While the parallel conductors reduce the resistance of the coil windings they do not significantly change its inductance. The Dipole Moment of the transmit antenna configuration can therefore only be increased by increasing either the antenna size (and hence inductance) or current as with any other conventional loop antenna.

It is further known to use an underground mine communication system to effect mine-wide communication and an intrinsically safe current limiter circuit for insuring that electrical equipment in the system will not cause incendiary conditions. This current limiter ensures that the current does not exceed the limits specified by MSHA for intrinsic safety, and the transmitter Dipole Moment is thus limited as described above.

In addition, antennas for through the earth communications comprising a plurality of conducting loops where each loop may be driven by a separate transmitter have been described. The transmitters provide identical drive signals to each loop, and the loops are arranged so that their magnetic fields combine. Such an arrangement may be adapted to intrinsically safe applications by adding a current limiting circuit between each transmitter and antenna loop.

FIG. 1 is a block diagram of a conventional multi-loop antenna system. For clarity, the diagram illustrates a system with three loop antennas but other numbers (m) of antennas may be used. A VLF signal source 1 is connected to three transmit amplifiers 2a, 2b, 2c which provide an output signal that is conditioned by a matching circuit 3a, 3b, 3c and a transformer 4a, 4b, 4c to drive a current into the low impedance antenna loops 5a, 5b, 5c. A current and voltage limiter circuit, shown in dashed boxes, 6a, 6b, 6c is used between each amplifier and loop antenna to prevent the antenna current and voltage from exceeding the known safe levels for a given loop inductance. Thus if the current in one of the wires is interrupted by severing or disconnecting the wire, it will not be capable of igniting a flammable atmosphere.

If m loops are used however, the mutual coupling between the loops increases the impedance seen by the transmitter. The current in each loop can then only be maintained by increasing the transmitter voltage, which in turn imposes a lower safe current limit. To maintain the voltage and current within a safe range it is therefore necessary to limit the number of loops m to a small number, i.e. four loops, and the practical improvement in the Dipole Moment and distant magnetic B-field afforded by using multiple current limited transmit antennas is quite small.

Thus, it is clear that there remains a need to improve the performance of the transmitter for magneto inductive communications while meeting all the requirements for the intrinsic safety of the system. There is a further need for a transmitter suitable for through-the-earth radio communication using electro-magnetic induction that reduces the energy available to initiate an ignition in a flammable atmosphere when the current is interrupted.

SUMMARY OF THE INVENTION

In accordance with a first broad aspect, there is provided a Very Low Frequency (VLF) transmit antenna system for through-the-earth communications based on magneto inductive coupling, the system comprising at least two loop antennas arranged such that a magnetic field of each one of the at least two loop antennas passes through each remaining one of the at least two loop antennas, thereby closely magnetically coupling the at least two loop antennas, and at least two transmitters each directly connected to and driving a corresponding one of the at least two loop antennas.

In accordance with a second broad aspect, there is provided a method for creating a VLF modulated magnetic field for through-the-earth communications based on magneto inductive coupling, the method comprising modulating a data signal onto a VLF carrier frequency, converting the modulated signal into a PWM control signal, and applying the PWM control signal to at least two full bridge transmitters, each transmitter directly connected to a corresponding one of at least two separate loop antennas.

In accordance with a third broad aspect, there is provided a VLF transmit antenna apparatus for creating a VLF modulated magnetic field for through-the-earth communications based on magneto inductive coupling, the apparatus comprising at least two separate loop antennas, at least two PWM transmitters each directly connected to and driving a corresponding one of the at least two loop antennas, and a digital signal processor coupled to the at least two transmitters and generating a PWM control signal driving the at least two PWM transmitters.

DESCRIPTION OF THE DRAWINGS

Further features and advantages of the present invention will become apparent from the following detailed description, taken in combination with the appended drawings, in which.

DETAILED DESCRIPTION

The performance of a transmitter based on a single loop antenna (not shown) is first described, in order to explain the improvement provided by the present invention. For a single loop antenna, the current is determined by the voltage of the transmitter driving the antenna and the impedance of the antenna. This impedance has two components, the wire resistance and the wire inductance. The inductance ($L_a$) of a wire loop is given by:

$$L_a = 2.00 \times 10^{-7} N_a^2 c_1 \sqrt{A_a} \left[ \ln \frac{c_1 \sqrt{A_a}}{\sqrt{N_a}\, d} - c_2 \right] \quad [2]$$

where,
$N_a$=number of turns in the loop,
$A_a$=area of the loop,
d=diameter of the wire, and
$c_1$, $c_2$ are constants related to the geometry of the loop. For a square loop, $c_1$=4.00 and $c_2$=1.217.

For a single square loop 30 m×30 m, the inductance is approximately 120 µH.

Using the same parameters, the resistance of the antenna (Ra) is determined by the length of wire and its conductivity:

$$R_a = \frac{4\rho N_a c_1 \sqrt{A_a}}{\pi d^2} \quad [3]$$

where $\rho$ is the resistivity of the wire (for copper wire $\rho$=1.72× 10-8 ohm·m)

For a 30×30 m loop constructed from #14 copper wire, the resistance is approximately 1 ohm. Since a VLF transmit antenna suitable for use underground is very small compared to a wavelength ($\lambda$), e.g. $\lambda$=33 km at 10 kHz, the radiation resistance is negligible compared to the wire resistance. The effect of the shunt capacitance to ground on the antenna impedance is also very small below 10 kHz and may be neglected. The impedance (Za) of the antenna is then given by:

$$Z_a = R_a + j\omega L \quad [4]$$

where
$R_a$=the resistance of the wire,
$\omega$=the frequency of the transmitted signal, in r/s, and
L=the antenna inductance, as above.

For a given maximum transmitter output voltage, the peak current ($I_a$) in the antenna is then given by:

$$|I_a| = \frac{V_S}{|R_C + j\omega L|} \quad [5]$$

where Vs is the maximum transmitter output voltage.

If the transmit antenna wire is disconnected or severed, the collapse in the loop's magnetic field induces a back electromotive force (EMF) across the inductor. Faraday's Law shows that magnitude of the EMF in the loop is equal to the rate of change of the magnetic field. In mathematical form this is expressed as:

$$\epsilon = \frac{d\,dp}{dt} \quad [6]$$

where, $$\frac{d\,dp}{dt} = L \cdot \frac{dI}{dt} \quad [7]$$

and where $\epsilon$ is the back EMF, L is the inductance of the loop, and I is the current that produces the magnetic field $\phi$. When the circuit is abruptly broken, the rate of change of the magnetic field can be very high, producing a correspondingly large back EMF across the break in the antenna wire. This high voltage can create a spark discharge capable of igniting an explosion in an area containing a hazardous gas, liquid or dust.

Figure 1:
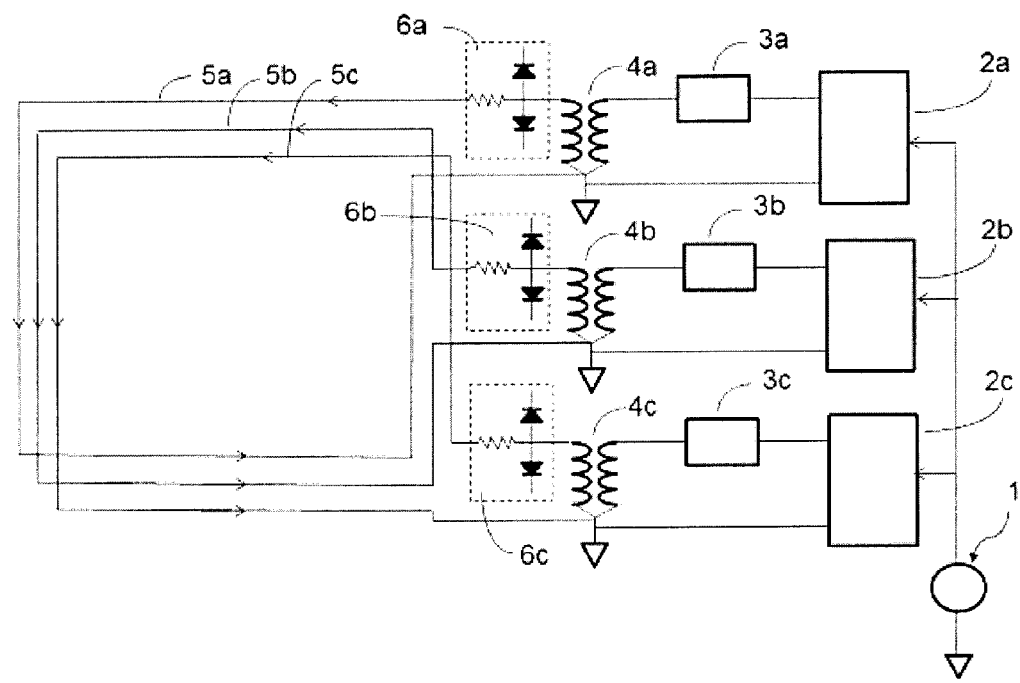
FIG. 1 is a schematic block diagram of a prior art intrinsically safe antenna system for through the earth communications.
Figure 2:
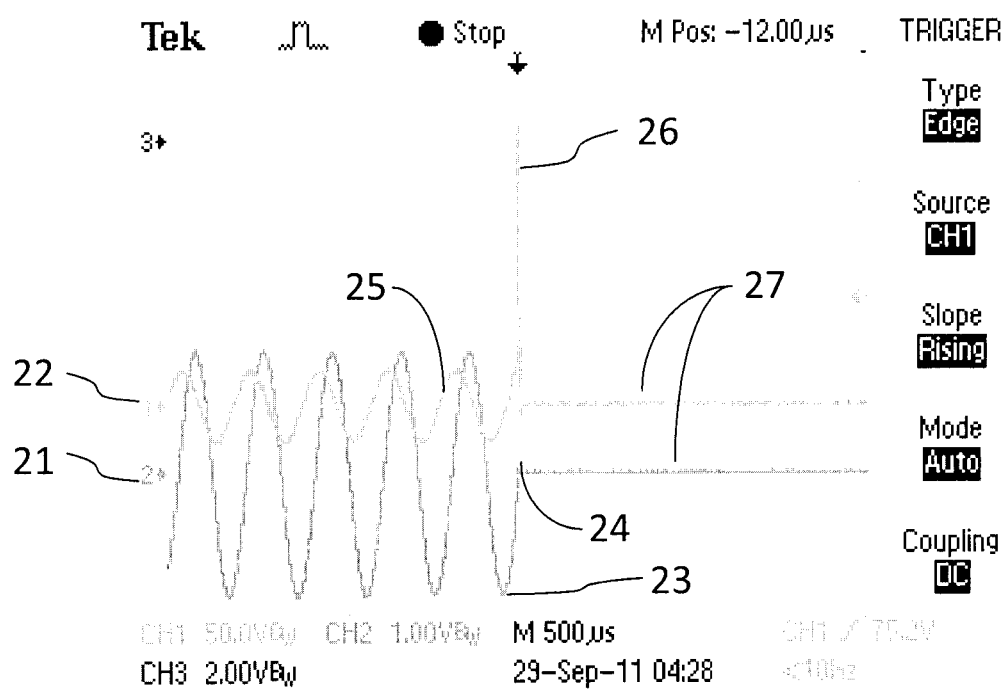
FIG. 2 is a plot of voltages and currents in a loop antenna when the current is interrupted.

FIG. 2 is a plot of the antenna current 21 and voltage 22 for a loop antenna with an inductance of 80 µH driven with an 8 A peak transmit signal. The larger sinusoidal waveform 23 is the transmitter current, which is interrupted by an open circuit at point 24. Initially the AC voltage 25 across the antenna is 24V peak, but when the circuit is broken, the impulse 26 produced by the back EMF is in excess of 200V, creating a visible spark. In the steady state condition 27, both the voltage and the current in the open circuited loop are zero. To prevent ignition of an explosive atmosphere by the spark, the amount of energy released when the current is interrupted must be strictly limited. This in turn places limits on the antenna inductance, input voltage and current. The limits have been established by a number of regulatory agencies, based on extensive experimentation with different types of explosive atmospheres.

Figure 3:
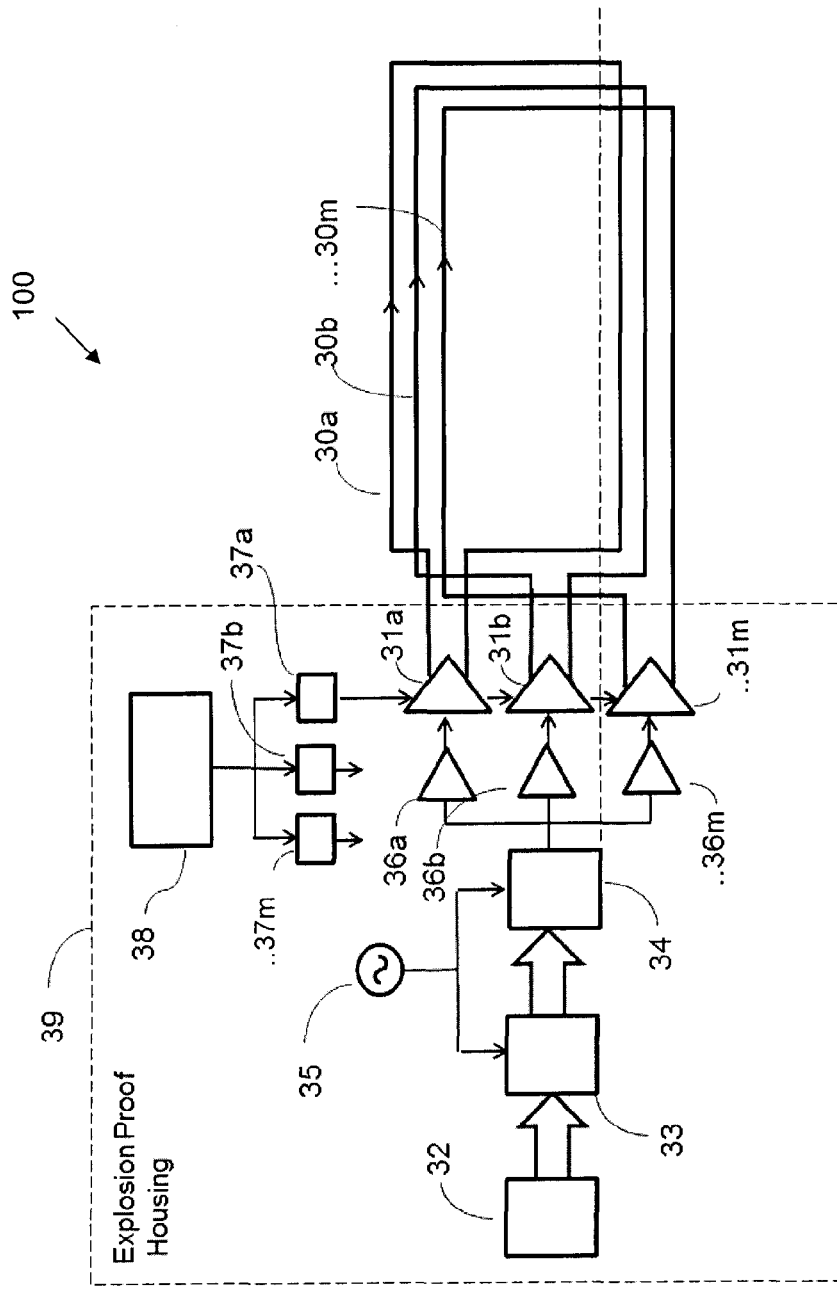
FIG. 3 is a block diagram of a VLF transmit antenna system in accordance with an illustrative embodiment of the present invention.

FIG. 3 is a schematic block diagram of a VLF Transmit Antenna System 100. In this system 100, the back EMF in an open-circuited loop is suppressed by using one or more additional loops of equal size that are closely coupled to the first loop and driven by a transmitter circuit designed to be able to provide a rapid output in current in response to a change in load. When one of the loops is broken and its magnetic field collapses, the other transmitters are able to increase the current in the remaining loops and maintain a constant magnetic field, thus preventing a spark from being generated.

A number (m) of physically separate single turn loops 30a, 30b, . . . 30m are used to create a VLF magnetic field and are each driven by a separate full bridge Pulse Width Modulated (PWM) transmit amplifier or transmitter 31a, 31b, . . . 31m. The input to the system 100 is a data source 32 which may be either text data from a keypad or other source or digitally processed and compressed voice. The digital data is input to a modulator 33 where it is used to phase and/or amplitude modulate a sinusoidal carrier to create a transmit signal waveform with a frequency in the range 300 Hz to 10 kHz, suitable for through the earth communications. This modulation may be QPSK or n-QAM for example.

The modulated transmit signal waveform is then input to a PWM modulator 34, which provides the control signals to drive the full bridge PWM transmitters 31a, 31b, . . . 31m. The PWM clock frequency is made at least four times that of the modulated sinusoidal carrier to provide an output with low distortion. The clock period should also be less than one eighth (⅛) that of the natural response time of the antenna, as determined by its inductance and resistance, in order to provide a fast and accurate response to a change in load. For example, for a loop antenna with an inductance of 120 µH and resistance of 1 ohm and that has a time constant of 120 µsec, a PWM period of less than 15 µsec is desired.

In practice, it is possible to operate the PWM modulator 34 at sample rates up to 200 kHz, providing a very fast response time to a change in antenna impedance. The carrier and PWM frequencies are derived from a common stable clock 35. The PWM control signals are buffered by drivers 36a . . . 36m that provide level shifted signals for the switching devices in each transmitter 31a, 31b, . . . or 31m. The transmitter outputs then have the same amplitude and phase and are connected directly to the antenna without passing through a current limiting circuit. A small Electromagnetic Interference (EMI) filter (not shown) may be connected in series with the antenna without affecting the operation of the system.

Each transmitter 31a, 31b, . . . or 31m is supplied via a separate protection circuit 37a . . . 37m that prevents an excess voltage or current being supplied to the transmitter. These are in turn connected to a common DC power supply 38, which may include a back-up battery. The conductors used to form the antenna loops 30a, 30b, . . . 30m are run close together around the circumference of a common area (not shown), each forming a separate single turn (N=1) loop antenna. The conductors are separately insulated with sufficient spacing to prevent them becoming short-circuited. This topology causes most of the magnetic field created by each loop, e.g. loop 30a, to pass through all the other loops, e.g. loops 30b, . . . 30m, so that they are tightly coupled together by a magnetic field created by the ensemble of loops 30a, 30b, . . . 30m. Also, because each transmitter 31a, 31b, . . . or 31m is driven by the same PWM waveform, the antenna currents are identical and in-phase. The distant magnetic B-field produced by the antenna is the sum of the fields created by each loop 30a, 30b, . . . or 30m.

The electrical components may be housed in an explosion proof enclosure 39, shown as a dashed box. Still, it is desirable for the antenna wires to be exposed in order to create a magnetic field that can be detected at a distance. The magnetic coupling between loops is highest if the insulated wires forming each loop are laid directly on top of one another. However, if the wires arranged around the circumference of a 30 m×30 m antenna area are separated from one another by up to 10 cm for example, the loops are still closely coupled, with a coupling factor exceeding 95%. This coupling factor is sufficient to suppress the voltage across an open circuit loop as described above.

Figure 4:
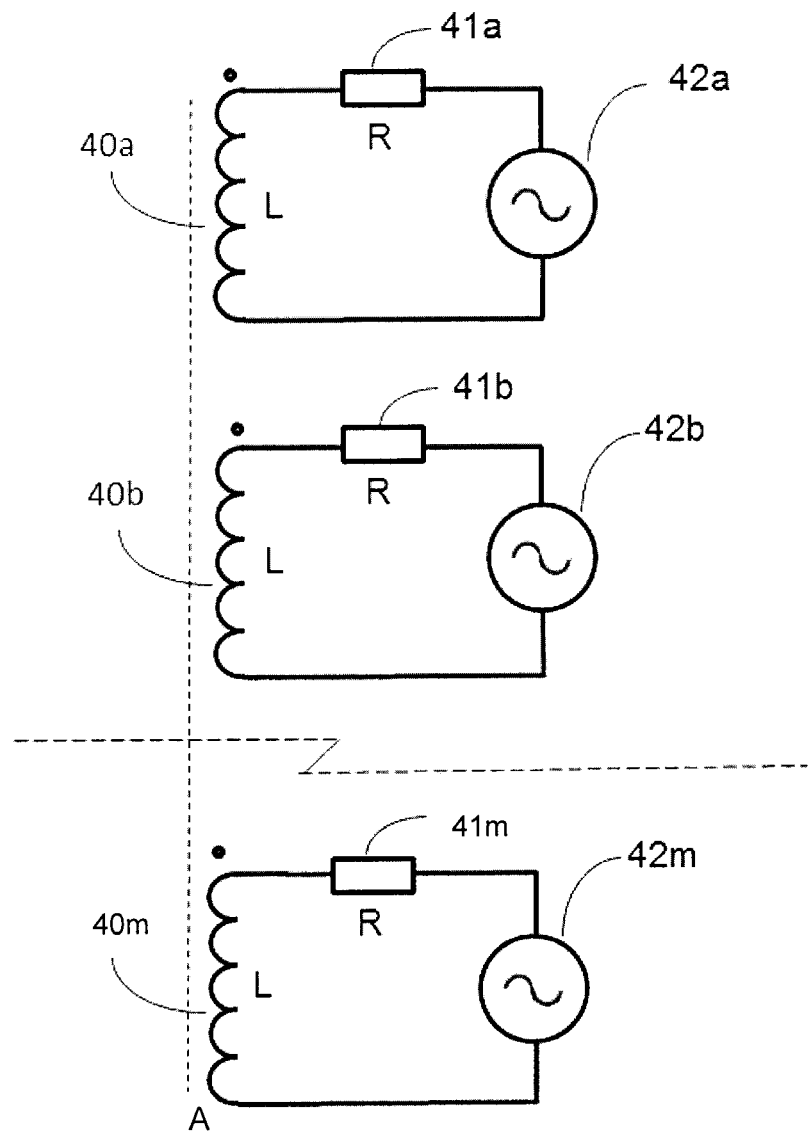
FIG. 4. is a schematic circuit diagram of the VLF transmit antenna system of FIG. 3.

FIG. 4 is a schematic circuit diagram of the antenna system 100. Each loop 30a, 30b, . . . 30m is represented by its individual inductance (L) 40a, 40b, . . . 40m and resistance (R), 41a, 41b, . . . 41m and is connected across an AC voltage source 42a, 42b, . . . 42m representing the transmitter 31a, 31b, . . . 31m. The magnetic coupling between the loops 30a, 30b, . . . 30m is represented by the dashed line A. The loops 30a, 30b, . . . 30m are illustratively driven at the same frequency and in-phase, as illustrated by the dot convention on each inductor. The back EMF in the inductor in loop 1, e.g. loop 30a, is given by:

$$\epsilon_1 = \frac{-dI}{dt} \cdot \{L1 + k_{12}(L1 \cdot L2)^{1/2} + k_{13}(L1 \cdot L3)^{1/2} \ldots k_{1m}(L1 \cdot Lm)^{1/2}\} \quad [8]$$

where L1, Lm are the inductance of loops 1 and m respectively and $k_{1m}$ is the coupling coefficient between these two loops. In one embodiment of the present invention, the inductance of each loop and the magnetic coupling between any pair of loops is approximately the same, so equation [8] may be generalized to:

$$\epsilon_m = \frac{-dI}{dt} \cdot L \cdot m \cdot k \quad [9]$$

where k is the common coupling coefficient and m is the number of loops. The back EMF in each loop is thus increased by a factor (k·m) compared to a single loop (see equations [6] and [7]). For a fixed supply voltage, the current in each loop ($I_m$) is then reduced by the same factor compared to the current (I) in a single loop, so that:

$$I_m = \frac{I}{k \cdot m} \quad [10]$$

If one loop becomes open circuit, the current in that loop falls to zero and, as a result of the reduction in load impedance, the current in the remaining loops increases to:

$$I_{m-1} = \frac{I_a}{k \cdot (m-1)} \quad [11]$$

Expressed as a ratio, the increase is then:

$$\frac{I_{m-1}}{I_m} = \frac{m}{(m-1)} \quad [10]$$

Provided the transmitter output is not current limited and the transmitter response is fast enough, this increase in current compensates for the loss of current in the open circuit loop, and maintains the magnetic field through the loops at a constant level, thus preventing a back EMF across the open circuit.

Figure 5:
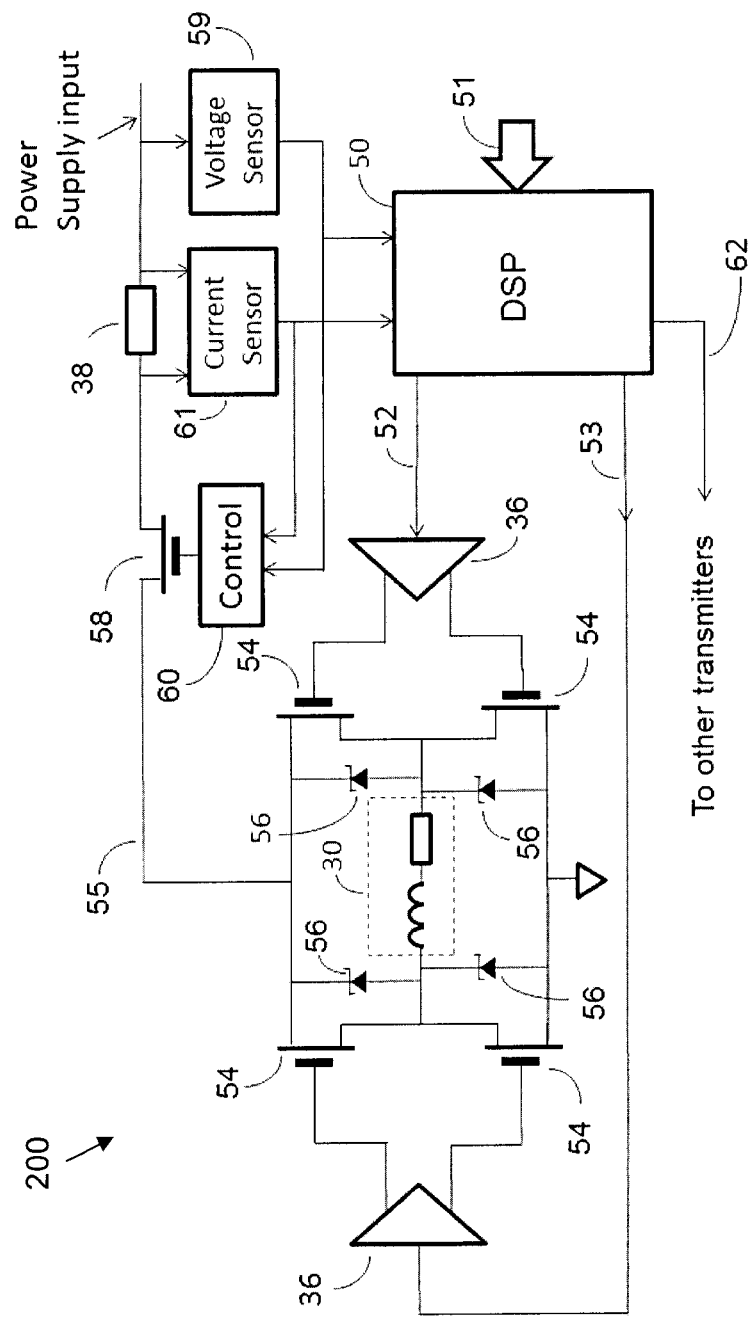
FIG. 5 is a schematic diagram of an apparatus for creating a magnetic field at low frequencies in accordance with an illustrative embodiment of the present invention.

FIG. 5 is a schematic circuit diagram of an apparatus 200 for creating a magnetic field at low frequencies, the diagram showing an embodiment of one of the transmit amplifiers 31a, 31b, . . . 31m and protection circuits 37a, 37b, . . . 37m. The signal modulation functions 33, 34 of FIG. 3 are implemented by a Digital Signal Processor (DSP) 50. The input to the DSP 50 is the data to be transmitted 51 and the outputs are two complementary PWM control signals 52, 53. These are converted by a driver circuit 36 into level shifted gate control voltages for four Field Effect Transistors (FETs) 54 that form the output stage of the PWM transmit amplifier, e.g. transmit amplifier 31a. These FETs 54 are arranged in a full bridge configuration such that either end of the antenna loop, whose equivalent circuit 30 is shown in a dashed box, can be switched to either ground or the transmitter supply voltage 55. An alternating voltage can thus be applied to the antenna by driving the bridge with the appropriate PWM waveforms.

The FETs 54 are turned on and off at high clock rate, for example 96 kHz and with a duty cycle between 0 and 100%. The duty cycle determines the instantaneous output voltage applied across the antenna, and thus the antenna current. Each FET 54 is bypassed by a diode 56 that provides protection against a reverse or excess drain-source voltage.

The transmitter, e.g. transmitter 31a, is powered from an external power supply 38, which is connected to the transmitter power supply 55 via a current sense resistor 57 and a series control FET 58. The input voltage to the transmitter as in 31a is monitored by a voltage sensing circuit 59, which turns off the series FET 58 via control circuit 60 if the voltage exceeds a safe value for the antenna. A current sensor 61 connected across the sensor resistor 57 monitors the peak current driven into the antenna and also turns off the series FET 58 via control circuit 60 if the peak current exceeds the safe value for the multiple loop VLF antennas. The control circuit 60 is designed to reduce the transmitter supply voltage via the series FET 58 slowly so that the rate of change of magnetic field in the antenna is also slow and will not itself generate an unsafe back—EMF if the antenna is intermittently short circuited. The circuits employed to implement the voltage sensor 59, current sensor 61, series control FET 58 and control circuit 60 are illustratively triply redundant such that the protection functions remain in place in the event of any two independent circuit faults.

The voltage sensor 59 and current sensor 61 are also connected the DSP 50, or other control logic, in order to implement additional control functions. For example, the PWM output may be modified or disabled based on the state of the sensor outputs. A status signal is also illustratively sent to and received from the other transmitters as in 31b, . . . 31m in the system over communications link 62. This signal is used to indicate if the transmitter 31a has been switched off due to over-current or over-voltage conditions, or if the current is very low, indicating that the antenna is disconnected. This signal can also be used to reduce the maximum current in the other antenna loops to the original value when one loop is disconnected. Alternatively it may be used to shut down all the other transmitters when a fault condition is detected in one transmitter.

Figure 6:
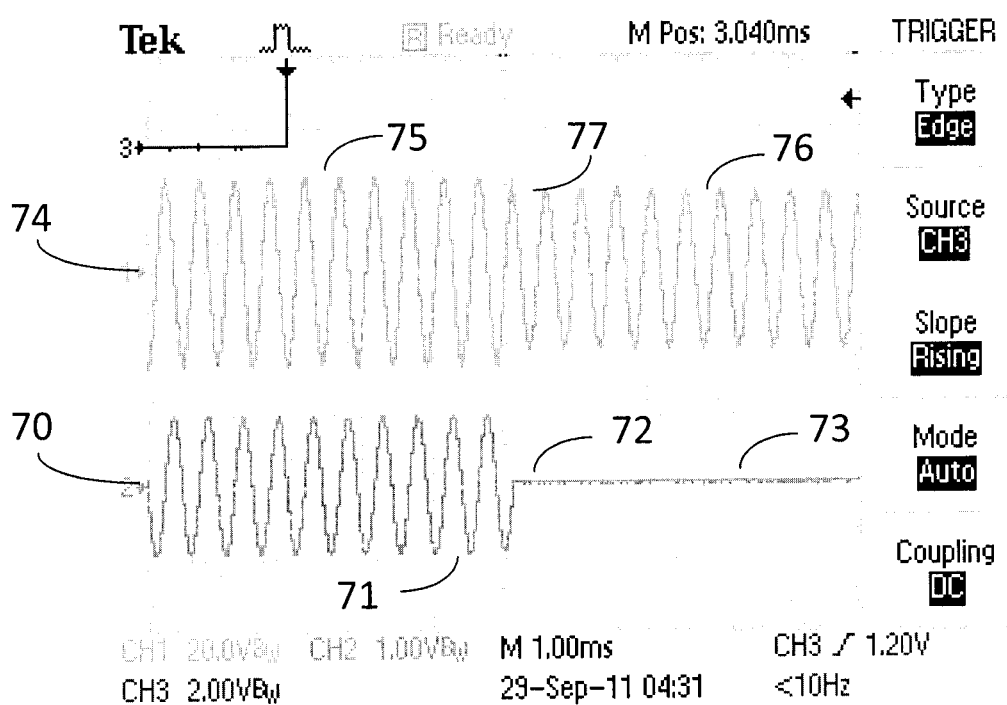
FIG. 6 is a plot of the voltages and currents in the antenna loop of the VLF transmit antenna system of FIG. 3.

The operation of the VLF Transmit Antenna system is illustrated in FIG. 6, which is an oscilloscope plot of the current and voltage in one of the antenna loops of the VLF Transmit Antenna. In this example, two separate loops as in 30a and 30b are used and each connected to a PWM transmitter as in 31a, 31b, as described above. The lower trace 70 shows the current 71 in the loop, e.g. loop 31a, which is made open circuit at time 72. The AC waveform is at the same value as when the open circuit was created at time 22 shown in FIG. 2. After time 72, the current 73 is zero. The upper trace 74 shows the voltage across the antenna loop open circuit. Because the antenna load is predominantly inductive, the antenna loop voltage and current are phase shifted by ninety (90) degrees.

When the current is interrupted at time 72, the voltage waveform transitions smoothly from the transmitter output voltage 75 to the slightly lower back EMF 76 induced in the now open circuited loop by the current in the second loop. Only a small impulse 77, in this case lower than 5V, is added to the waveform at the point where the circuit is interrupted. This is forty times less than produced by the same antenna when operated as an isolated loop, and the energy released by the open circuit (proportional to the square of voltage) is 1600 times less. The maximum safe current of the present invention is therefore clearly much higher than for a single loop or current limited multi-loop antenna.

The EMF 75 induced from the second, operational, loop, e.g. loop 31b, is in-phase with the transmitter voltage, and so, if the circuit is re-connected, the initial surge current is also reduced. The circuit therefore remains safe in the event of an intermittent open circuit. However, it is preferable to safely shut down the transmitter if an open circuit is detected in the antenna loop. This function is implemented by separate protection circuits as in 37a, 37b, . . . 37m for each transmitter 31a, 31b, . . . 31m, as illustrated in FIG. 3. Each protection circuit 37a, 37b, . . . or 37m reduces the current to the corresponding transmitter 31a, 31b, . . . or 31m at a rate, which will not provide a significant back EMF.

While dependent on many factors, the ability of a circuit to create ignition is generally dependent on the energy released when the circuit is broken or made open circuit. In the case of a current flowing in an inductor, the energy E stored in the magnetic field is given by:

$$E = \frac{1}{2} L \cdot I^2 \qquad [13]$$

Due to imperfect coupling and transmitter response times, in a practical antenna system, only 98% of this energy may be replaced by the increased current in the other loops. The energy available for spark production is then 2% of a single loop antenna with the same inductance and current. The current $I_m$ in each loop of the VLF Transmit Antenna System 100 may therefore be increased by a factor of up to $(0.02)^{-1/2}$ or seven times without increasing the energy available for ignition.

The Dipole Moment (DM) of a conventional single loop antenna with current $I_0$ is given by:

$$DM = I_0 \cdot A = \frac{V \cdot A}{|Z|} \qquad [14]$$

The Dipole Moment of an intrinsically safe single loop antenna is given by:

$$DM = I_s \cdot A \qquad [15]$$

where $I_s$ is the maximum safe current for a given transmitter voltage and loop inductance. If $I_s$ is less than $I_0$, the antenna current must be limited to $I_s$ by a current limiter circuit. For a multi-loop antenna, the current in each loop is reduced by mutual coupling as described above. An optimal design uses m loops such that the current $I_m$ in each loop is equal to $I_s$. The Dipole Moment of a conventional multiple loop antenna can then be m times that of a single loop antenna, such that:

$$DM = m \cdot I_s \cdot A \quad [16]$$

The Dipole moment of the VLF Antenna System is then given by:

$$DM = (7) \cdot m \cdot I_s \cdot A \quad [17]$$

The VLF Transmit Antenna System using four loops and transmitters therefore provides a Dipole Moment seven times greater than possible for a conventional intrinsically safe four loop antenna system and the magnetic field received at a distance will be 17 dB higher.

Figure 7A:
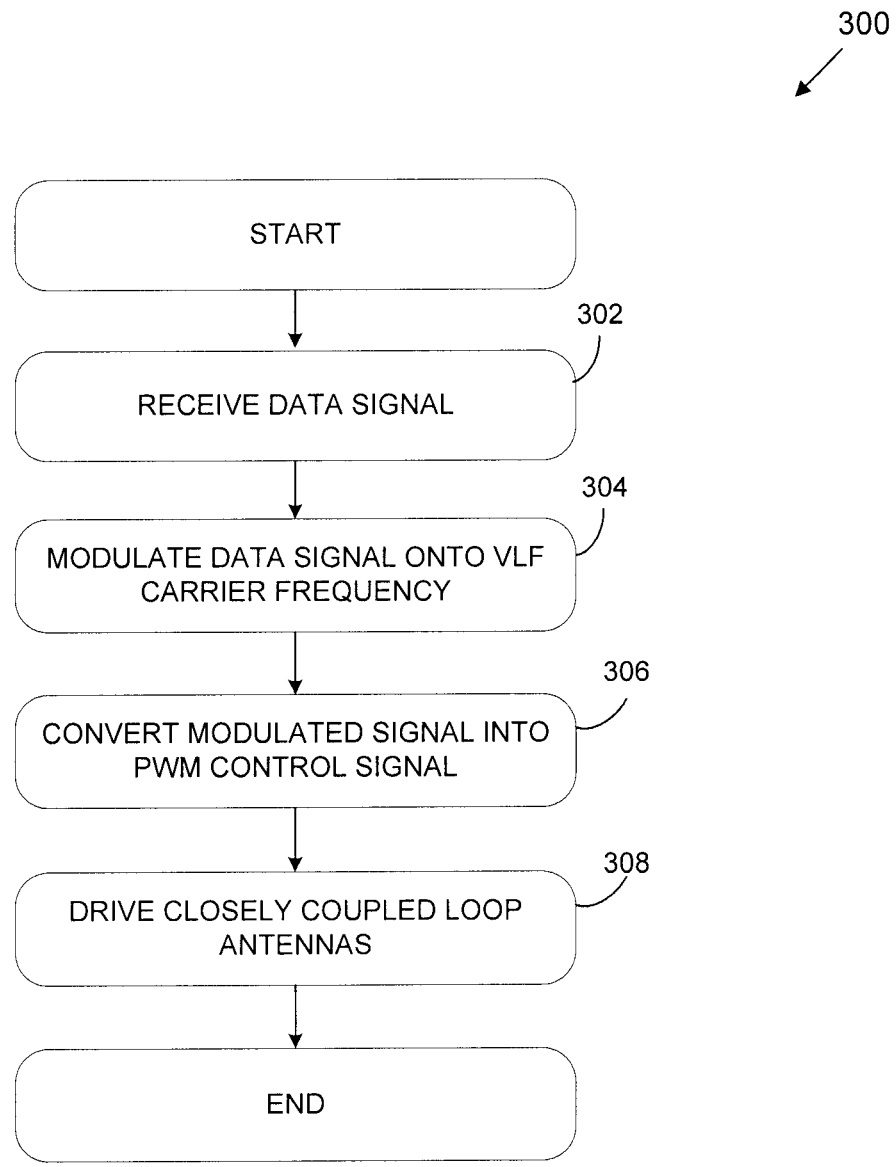
FIG. 7a is a flowchart of a method for creating a magnetic field at low frequencies in accordance with an illustrative embodiment of the present invention.

Referring now to FIG. 7a, a method 300 for creating a magnetic field at low frequencies will now be described. The method 300 illustratively comprises at step 302 receiving a data signal, modulating the data signal onto a VLF carrier frequency at step 304, and converting the modulated signal into a PWM control signal at step 306, as described above with reference to FIG. 3. The method 300 further comprises driving closely magnetically coupled loop antennas at step 308. The method 300 may be executed at each discrete PWM cycle, i.e. repeated every clock cycle.

Figure 7B:
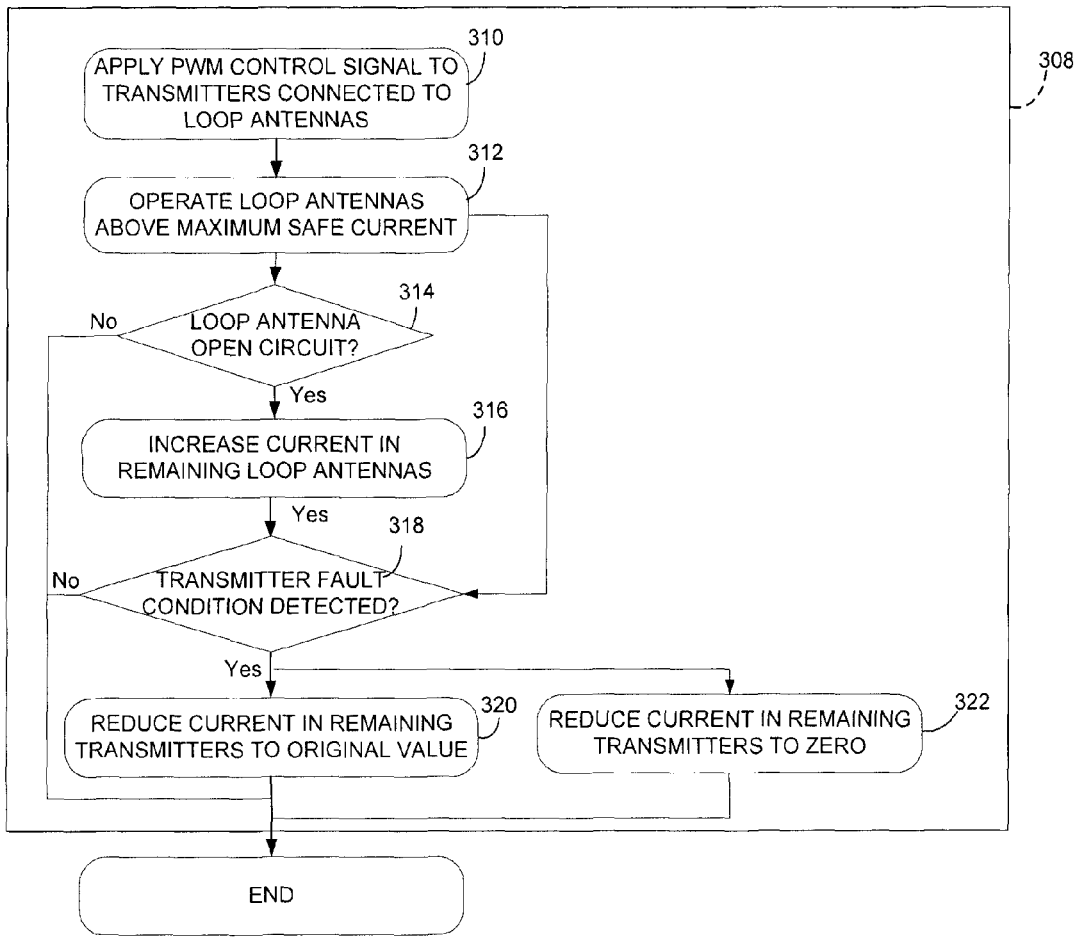
FIG. 7b is a flowchart of the step of FIG. 7a of driving loop antennas.

Referring to FIG. 7b, the step 308 of driving the loop antennas illustratively comprises applying at step 310 a PWM control signal to transmitters coupled to the loop antennas. The step 308 may further comprise operating at step 312 the loop antennas at a current that is above a maximum safe current of an equivalent single loop antenna. In this manner, the distant magnetic field produced by the ensemble of the loops may be increased, as discussed above. The step 308 may further detect at step 314 whether one of the loop antennas is open-circuited. If this is not the case, the method 300 may end. Otherwise, the current in the remaining loop antennas may be increased at step 316 so as to suppress the back EMF in the loop that is made open circuit. The method 300 may also determine at step 318 whether a fault condition, e.g. an open circuit, has occurred in one of the transmitters. As discussed above, this may be effected using status signals received from the transmitters. If no fault is detected, the method 300 may end. Otherwise, the current in the remaining transmitters may be slowly reduced at step 320 to the original value, with the open circuit transmitter disconnected. Alternatively, the current may be slowly reduced to zero, i.e. shut down, at step 322, thus preventing further transmission.

It is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein are for the purpose of description and should not be regarded as limiting.

It should be noted that the present invention can be carried out as a method, can be embodied in a system, or a device. The embodiments of the invention described above are intended to be exemplary only. The scope of the invention is therefore intended to be limited solely by the scope of the appended claims.

The invention claimed is:

1. A Very Low Frequency (VLF) transmit antenna system for through-the-earth communications based on magneto inductive coupling, the system comprising:

at least two loop antennas arranged such that a magnetic field of each one of the at least two loop antennas passes through each remaining one of the at least two loop antennas, thereby closely magnetically coupling the at least two loop antennas;

at least two transmitters each directly connected to and driving a corresponding one of the at least two loop antennas;

wherein each one of the at least two loop antennas comprises an insulated field wiring conductor forming a single loop that creates the magnetic field, the loops of the at least two loop antennas being of equal size; and wherein, in response to a break in a wiring of the conductor of a selected one of the at least two antennas, each one of the at least two transmitters driving each remaining one of the at least two loop antennas automatically increasing a current in the loop of each remaining one of the at least two loop antennas in response to a reduction in load impedance, thereby suppressing a back EMF resulting from the break in the wiring.

2. The system of claim 1, wherein the conductors of the at least two loop antennas are arranged to lie around a circumference of a common area, such that the loops of the at least two loop antennas are closely coupled and a distant magnetic field equal to a sum of the magnetic fields created by the loops of the at least two loop antennas is produced.

3. The system of claim 1, wherein each one of the at least two transmitters is a full bridge Pulse Width Modulated (PWM) transmitter.

4. The system of claim 3, wherein the at least two transmitters drive the at least two loop antennas with identical PWM signals such that modulated currents in the at least two loop antennas are the same and in-phase.

5. The system of claim 4, wherein a sampling period of each one of the PWM signals is less than one eighth of a time constant of each one of the at least two loop antennas, the time constant determined from an inductance and a resistance of the loop antenna.

6. The system of claim 1, wherein each one of the at least two loop antennas is operated such that a current in the loop thereof is increased above a maximum safe current of a single loop equivalent to the loops of the at least two antennas without creating a risk of ignition in the event that one of the loops is made open circuit.

7. A method for creating a VLF modulated magnetic field for through-the-earth communications based on magneto inductive coupling, the method comprising;

modulating a data signal onto a VLF carrier frequency;

converting the modulated signal into a PWM control signal;

applying the PWM control signal to at least two full bridge transmitters, each transmitter directly connected to a corresponding one of at least two separate loop antennas; and detecting a fault indicating that a selected one of the at least two transmitters is open circuit, reducing a current in each remaining one of the at least two transmitters to zero, and preventing further transmission by the at least two transmitters until the fault is cleared.

8. The method of claim 7, further comprising arranging in close proximity conductors each forming a loop of a corresponding one of the at least two loop antennas such that the conductors lie around a circumference of a common area and a magnetic field of each one of the at least two loop antennas passes through each remaining one of the at least two loop antennas, thereby closely magnetically coupling the at least two loop antennas.

9. The method of claim 8, further comprising operating each loop of the at least two loop antennas at a current higher than a maximum safe current for a single loop equivalent to the loops of the at least two loop antennas in order to increase a distant magnetic field produced by an ensemble of the loops.

10. The method of claim 9, further comprising detecting if one of the at least two transmitters is open circuit and slowly reducing a current in each remaining one of the at least two transmitters back to an original value.

11. The method of claim 8, further comprising automatically increasing a current in each remaining one of the loops in response to a reduction in load impedance thereby suppressing a back EMF in a selected one of the loops that is made open circuit.

12. A VLF transmit antenna apparatus for creating a VLF modulated magnetic field for through-the-earth communications based on magneto inductive coupling, the apparatus comprising:
at least two separate loop antennas;
at least two PWM transmitters each directly connected to and driving a corresponding one of the at least two loop antennas; and
a digital signal processor coupled to the at least two transmitters and generating a PWM control signal driving the at least two PWM transmitters;
wherein each one of the at least two loop antennas comprises an insulated field wiring conductor forming a single loop that creates a magnetic field, and further wherein the conductors are arranged around a circumference of a common area such that the magnetic field of each one of the at least two loop antennas passes through each remaining one of the at least two loop antennas, thereby closely magnetically coupling the at least two loop antennas;
wherein, in response to a break in a wiring of the conductor of a selected one of the at least two antennas, each one of the at least two transmitters driving each remaining one of the at least two loop antennas automatically increases a current in the loop of each remaining one of the at least two loop antennas in response to a reduction in load impedance, thereby suppressing a back EMF resulting from the break in the wiring.

13. The apparatus of claim 12, wherein each one of the at least two PWM transmitters comprises a full bridge configuration of power Field Effect Transistors (FETs) directly connected to the corresponding one of the at least two loop antennas.

14. The apparatus of claim 12, further comprising a power supply coupled to the at least two PWM transmitters and a protection circuit coupled to the power supply for protection thereof against at least one of an excess voltage and an excess current, wherein the excess current may be up to seven times an intrinsically safe current of a single loop antenna having a same size as that of each one of the at least two loop antennas.

15. The apparatus of claim 14, wherein the protection circuit comprises three separate redundant stages for providing the protection in the event of two independent circuit faults.

16. The apparatus of claim 12, wherein a status of each one of the at least two PWM transmitters is signaled to each remaining one of the at least two PWM transmitters to enable each one of the at least two PWM transmitters to reduce a current thereof to an original value or shut down if a selected one of the at least two loop antennas becomes open circuit.

\* \* \* \* \*